(12) United States Patent
Zeng et al.

(10) Patent No.: US 11,995,595 B2
(45) Date of Patent: May 28, 2024

(54) AUTOMATED STRUCTURED WORKFLOW RECOMMENDATION SYSTEM

(71) Applicant: XANT, INC., Austin, TX (US)

(72) Inventors: Xinchuan Zeng, Springville, UT (US); Michael Murff, Lindon, UT (US); Sameer Randal Manek, Seattle, WA (US)

(73) Assignee: Xant, Inc., Austin, TX (US)

( * ) Notice: Subject to any disclaimer, the term of this patent is extended or adjusted under 35 U.S.C. 154(b) by 392 days.

(21) Appl. No.: 16/291,500

(22) Filed: Mar. 4, 2019

(65) Prior Publication Data

US 2020/0286024 A1    Sep. 10, 2020

(51) Int. Cl.
*G06Q 10/0639* (2023.01)
*G06F 17/16* (2006.01)
*G06Q 10/0631* (2023.01)
*G06Q 10/0637* (2023.01)

(52) U.S. Cl.
CPC ....... *G06Q 10/06393* (2013.01); *G06F 17/16* (2013.01); *G06Q 10/06316* (2013.01); *G06Q 10/06375* (2013.01)

(58) Field of Classification Search
None
See application file for complete search history.

(56) References Cited

U.S. PATENT DOCUMENTS 9,460,401 B2    10/2016  Zeng et al.
2011/0010219 A1*  1/2011  Stearns ............ G06Q 10/06398
                                                    705/7.42

(Continued)

FOREIGN PATENT DOCUMENTS

JP        2008158971 A  *  7/2008

(Continued)

OTHER PUBLICATIONS

Gotz et al. DecisionFlow: Visual Analytics for High-Dimensional Temporal Event Sequence Data. IEEE Transactions on Visualization and Computer Graphics (vol. 20, Issue: 12, pp. 1783-1792). Published: Dec. 31, 2014 (Year: 2014).*

(Continued)

*Primary Examiner* — Patricia H Munson
*Assistant Examiner* — Nancy N Prasad

(57) ABSTRACT

Embodiments maintain historical activity information for a plurality of entity records. Each historical activity record includes a sequence-number that reflects a temporal position of the represented activity instance relative to other activity instances that targeted the corresponding entity. Based on this historical activity information, embodiments generate marginal value matrices (MVMs) that show the historical effectiveness of activities. Specifically, each entity is assigned to a bucket based on an associated entity score. An MVM charts a marginal value for each combination of bucket index and sequence-number, where the marginal value at each combination of bucket index and sequence-number is the average of the activity result values of the historical activity records, for entities assigned to the bucket index, having the sequence-number. Embodiments use MVMs to predict marginal values for activities targeted to each current entity of the salesperson. The estimated marginal values for each entity are displayed in a GUI.

20 Claims, 9 Drawing Sheets

(56) References Cited

U.S. PATENT DOCUMENTS

2013/0055268 A1* 2/2013 Amershi .................. G06F 9/46
718/101
2015/0100528 A1* 4/2015 Danson ................... G06N 5/04
706/21

OTHER PUBLICATIONS

Rzepakowski, Piotr, and Szymon Jaroszewicz. "Uplift modeling in direct marketing." Journal of Telecommunications and Information Technology (2012): 43-50.
Lo, Victor SY. "The true lift model: a novel data mining approach to response modeling in database marketing." ACM SIGKDD Explorations Newsletter 4.2 (2002): 78-86.
Lo et al., "From Predictive Uplift Modeling to Prescriptive Uplift Analytics: A Practical Approach to Treatment Optimization While Accounting for Estimation Risk." dated 2015, pp. 79-95.

* cited by examiner

|   | 1 | 2 | 3 | 4 | 5 | 6 | 7 | 8 | 9 |
|---|---|---|---|---|---|---|---|---|---|
| A | $120.00 | $118.04 | $117.38 | $115.17 | $113.12 | $110.98 | $109.41 | $108.03 | $105.43 |
| B | $110.61 | $106.67 | $100.47 | $97.44 | $95.30 | $93.81 | $91.00 | $90.96 | $89.30 |
| C | $85.65 | $86.02 | $87.65 | $88.90 | $90.51 | $89.15 | $88.72 | - | - |
| D | $83.34 | $84.17 | $82.00 | $83.14 | $80.94 | $79.02 | - | - | - |
| E | $74.29 | $74.66 | $74.30 | $74.27 | $67.51 | $64.84 | $64.01 | $63.25 | $62.05 |

FIG. 5

|   | 1 | 2 | 3 | 4 | 5 | 6 | 7 | 8 | 9 |
|---|---|---|---|---|---|---|---|---|---|
| A | $51.50 | $31.95 | $13.87 | $3.07 | ($2.13) | ($15.81) | ($21.20) | ($21.20) | ($21.20) |
| B | $2.95 | $18.81 | $21.20 | $45.50 | $16.80 | $6.25 | ($5.81) | ($21.20) | ($21.20) |
| C | $9.52 | $6.45 | ($2.12) | ($15.81) | ($21.20) | ($21.20) | ($21.20) | ($21.20) | ($21.20) |
| D | $6.51 | ($6.16) | ($21.20) | ($21.20) | ($21.20) | ($21.20) | ($21.20) | ($21.20) | ($21.20) |
| E | ($5.81) | ($21.20) | ($21.20) | ($21.20) | $35.00 | ($21.20) | ($21.20) | ($21.20) | ($21.20) |

(INCREMENTAL MARGINAL VALUES)

(MAXIMUM CUMULATIVE MARGINAL VALUES)

(MAXIMUM FUTURE STEP)

AUTOMATED STRUCTURED WORKFLOW RECOMMENDATION SYSTEM

CROSS-REFERENCE TO RELATED APPLICATIONS

This application is related to U.S. Pat. No. 9,460,401, filed Oct. 31, 2014, titled "USING MACHINE LEARNING TO PREDICT BEHAVIOR BASED ON LOCAL CONDITIONS", the entire contents of which is hereby incorporated by reference as if fully set forth herein. This patent is referred to herein as the "Prospect Scoring Patent".

FIELD OF THE INVENTION

The present invention relates to an automated structured workflow recommendation system and, more specifically, to using marginal value data, generated based on sequenced historical activity information, to automatically generate and display structured workflow recommendations.

BACKGROUND

Many people are busy with activities that ultimately produce little benefits. For example, salespeople spend a majority of their time developing their leads and sales prospects into paying customers by selecting one or more ways to communicate with them. The salespeople make guesses regarding which next-step actions would be the most impactful. For example, it is not uncommon for a salesperson to make decisions about whether it would be more useful to continue a sales process with a highly-rated prospect, or to begin a new process with a lower-rated prospect. When the "next-step guesses" are wrong, productivity drops.

One way to help people make such time-value decisions is uplift modeling, which models the incremental impact of actions on the behavior of the prospects or leads being targeted. However, uplift modeling provides information about the propensity of a positive outcome without assigning any value to the positive outcomes and without incorporating potentially different costs associated with possible future actions. Furthermore, uplift modeling does not take into account data dimensions such as activity type, or activity sequencing. Thus, it can be difficult for a salesperson to use uplift modeling to determine which next action to take in order to optimize time usage.

Clearly there is a need to better assist salespeople in their "next-step" decisions in order to improve their productivity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 3 depicts an example marginal value matrix, where each row of the marginal value matrix represents an entity bucket index, and each column represents an activity sequence-number.

FIG. 5 depicts another example marginal value matrix, where each row of the marginal value matrix represents an entity bucket index, and each column represents an activity sequence-number.

DETAILED DESCRIPTION

Figure 1:
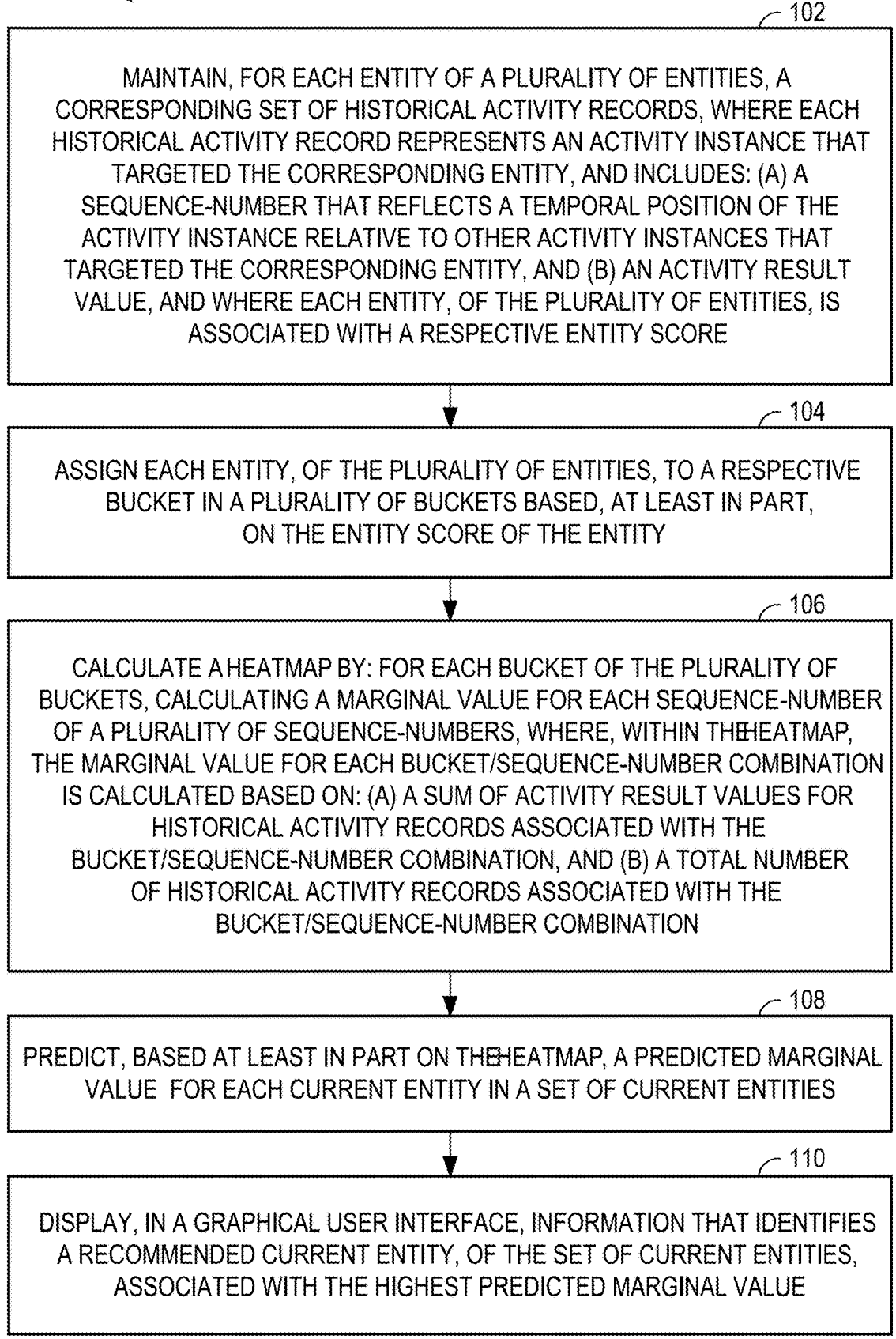
FIG. 1 depicts a flowchart for constructing a marginal value matrix from historical activity records and then using the marginal value matrix to predict marginal values for current entities.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To provide people with information about the potential values of possible next-step activities, an automated next-step advice generation system is provided. The automated next-step advice generation system takes into account a variety of objective factors, including activity type and historical data, in order to automatically generate next-step advice based on objective information.

Embodiments aid a salesperson to prioritize their activities by predicting marginal values of activities targeted to the current leads, prospects, etc. of the salesperson, and displaying the predicted marginal values in a recommended structured workflow display. Using a combination of sales prospect scoring, activity tracking, and activity outcome data, embodiments estimate the value of completing a given activity that is targeted to a particular current entity. Thus, embodiments build on uplift modeling by estimating the impact of an action based on recorded values of historical activity outcomes, rather than basing the information on the propensity of a positive outcome.

Specifically, embodiments maintain historical activity information (including historical activity outcomes that include activity result values such as dollar amounts resulting from the historical activity instances) for entity records that represent a plurality of entities. The plurality of entities includes any entity to which a sales activity has been targeted, e.g., prospect-type entities, customer-type entities, etc. Each historical activity record, associated with each entity record, includes a sequence-number that reflects a temporal position of the represented activity instance relative to other activity instances that targeted the corresponding entity.

Based on this historical activity information, embodiments generate one or more marginal value matrices (MVMs) that show the historical effectiveness of activities based on the activity sequence-number and an entity score that is generated for the associated entity. Specifically, embodiments assign each of the plurality of entities a respective entity score, which quantifies a particular quality of the entity, such as a likelihood that the entity will complete a purchase. Each of the plurality of entities is assigned to a bucket index based on the respective entity score. A given MVM charts an average activity result value (referred to herein as a marginal value) for each combination of bucket index and sequence-number, where the marginal value at a given combination of a particular bucket index and a particular sequence-number is the average of the activity result values of all of the historical activity records, for entities assigned to the particular bucket index, having the particular sequence-number.

Embodiments generate a structured workflow recommendation, for a given salesperson, by using the one or more generated MVMs to predict marginal values for a next activity targeted to each current entity of the salesperson. The estimated marginal values for each entity are displayed in a structured workflow recommendation graphical user interface. According to an embodiment, the entities are displayed in an order that is based on the associated predicted marginal values. According to an embodiment, the predicted marginal values are displayed as dollar amounts to effectively communicate the recommendation to the salesperson.

Embodiments account for action type. Specifically, according to an embodiment, MVMs are specific to activity type, thereby allowing for marginal values to more accurately communicate the potential value of a given type of activity. Further, according to an embodiment, the activities included in the recommended structured workflow for a given salesperson is based on a pre-determined cadence of activity types, which is designed to maximize activity effect on current entities. According to another embodiment, adaptive activity type selection is used to develop a dynamic sales cadence, for each current entity, based on the predicted marginal values of the different potential types of activities that may be targeted to the current entity.

Many times, there are hundreds of thousands, if not many millions, of possible tasks that compete for salesperson's attention, and it can be very difficult for a salesperson to accurately gauge which tasks will be most effective in generating sales completions. The systematic adherence of a salesperson to the structured workflow recommendations generated by embodiments can lead to sales increases of 30% or more because the recommended structured workflow generated by embodiments provides a data-driven basis for making sales activity decisions. The data trends captured by embodiments would be very difficult for a salesperson to manually identify given the amount of raw data that goes into generating the recommendations. The graphical display of the structured workflow recommendation allows the salesperson to sort current entities by predicted marginal value such that the salesperson can force rank their recommended tasks. This allows the salesperson to easily detect the activity that is predicted to be the most optimal use of their time, allowing the salesperson to allocate time on activities with the highest expected monetary return on effort.

Entity Data Store

FIG. 1 depicts a flowchart 100 for constructing a marginal value matrix from historical activity records and then using the matrix to predict marginal values for current entities. Specifically, at step 102 of flowchart 100, a corresponding set of historical activity records is maintained for each entity of a plurality of entities, where each historical activity record represents an activity instance that targeted the corresponding entity, and includes: (a) a sequence-number that reflects a temporal position of the activity instance relative to other activity instances that targeted the corresponding entity, and (b) an activity result value, and where each entity, of the plurality of entities, is associated with a respective entity score. For example, an MVM application running on a computing device maintains a data store of a plurality of entity records. An application or service, such as the MVM application, runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

Each of the plurality of entity records in the data store represents a particular entity, which is an individual or group of individuals (such as a company) that are in a sales pipeline. A sales pipeline includes multiple entity phases that indicate where the entity is in the sales process. For example, an entity is a lead (or in a lead phase of the sales pipeline) when the entity has not yet been targeted by a sales activity. An entity is a prospect (or in a prospect phase of the sales pipeline) when the entity has been targeted by at least one sales activity and has returned some kind of positive response. An entity is a customer (or in a customer phase of the sales pipeline) when the entity has completed a purchase. A customer may also be a prospect, depending on the nature of the sales product.

Figure 2:
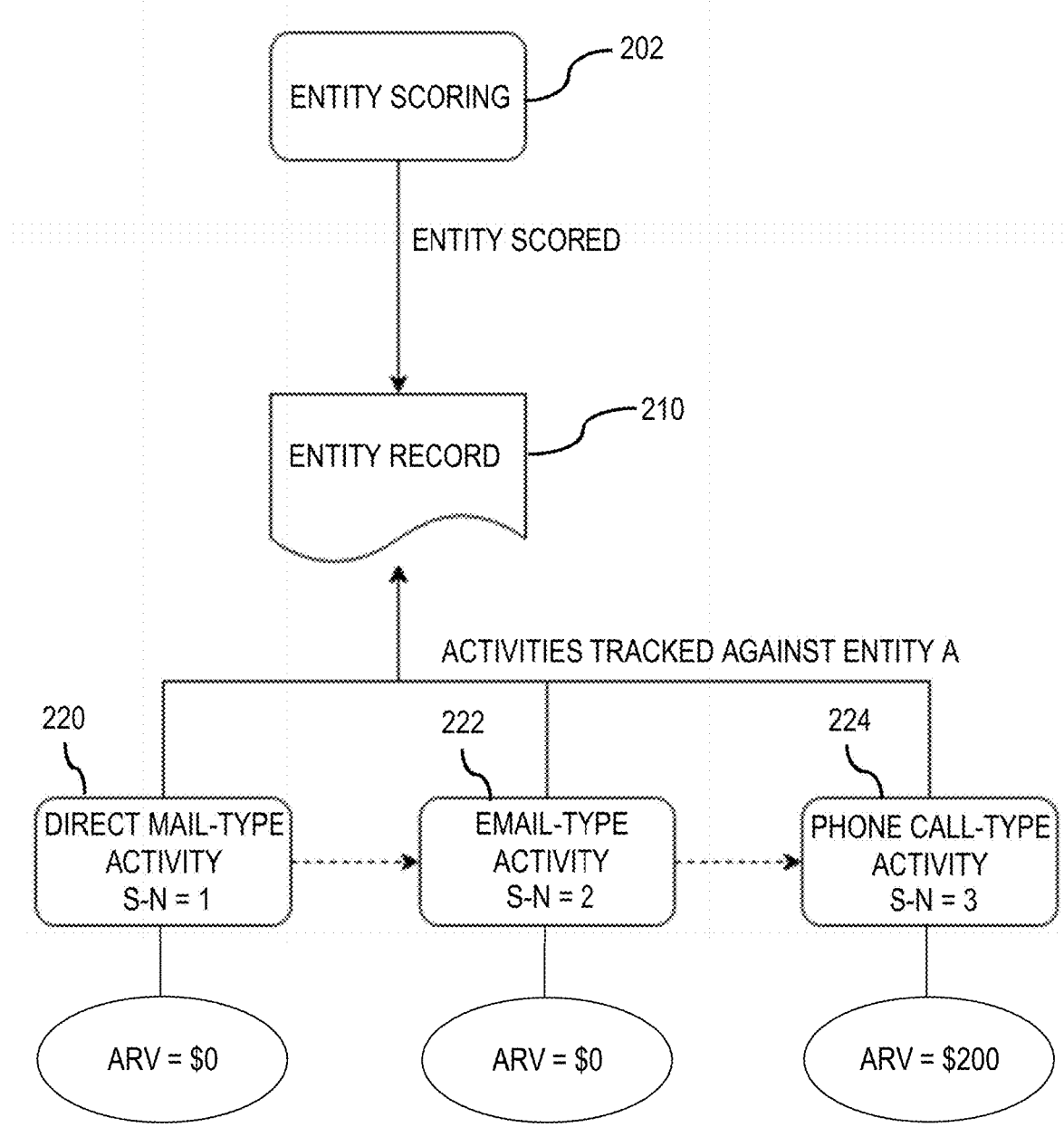
FIG. 2 depicts a diagram of an entity record maintained in an entity data store.

FIG. 2 depicts a diagram 200 of data maintained for a particular entity in an entity data store, information for which is recorded in an entity record 210. Each entity record in the entity data store is associated with a set of historical activity records that record any activity instances that targeted the associated entity. According to an embodiment, an entity record is specific to a particular entity/sales representative combination. Thus, the same entity being contacted by two different sales representatives would be represented, in the data store, by different entity records.

Entity scores are calculated for the entities based on which the MVM application builds an MVM. An entity score is calculated for a particular entity via an entity scoring technique 202 in diagram 200. Entity scoring technique 202 may be any scoring technique that generates an entity score for the given entity. Depending on the technique used to generate entity scores, an entity score generated for a given entity represents one or more of: a probability that the entity will progress to a next phase in the sales pipeline; a probability of the entity completing a purchase; a value of past purchases made by the entity; etc. The Prospect Scoring Patent referred to above describes an example technique of generating entity scores. However, embodiments are not limited to any particular technique or mechanism for entity scoring. In embodiments described herein, an entity score is a percentage indicating the probability that the associated entity will complete a future purchase. However, embodiments are not limited to any particular kind of entity score.

Furthermore, diagram 200 depicts a set of historical activity records 220-224, each of which represents an activity instance that targeted the entity represented by record 210. An activity instance that targets a given entity could be any kind of activity that is directed toward the entity, such as a telephone call, a direct mailing, an email, a text message, an in-person visit, a video chat, etc. Each historical activity record includes a sequence-number (shown as S-N in diagram 200) that reflects the order in which the represented activity instance was performed, temporally, among the activity instances that targeted the entity.

Each historical activity record is also associated with an outcome that includes an activity result value (ARV) and may also include an outcome type, such as transitioned to sales prospect, closed deal, etc. An ARV of a given historical activity record represents one or more of the following types of values:

An opportunity value, which quantifies the potential value associated with the opportunity generated based on the activity;

A sales revenue value, which is the amount of recognized/realized revenue generated as a result of the activity;

A margin value, which quantifies an amount of money that was made by the sales representative as a result of the activity;

A customer lifetime value (CLV), which is a prediction of the net profit that may result from having the entity in the sales pipeline;

An annual recurring revenue (ARR) value, which represents the value of contracted recurring revenue, resulting from the activity, for the period of one year.

A closed won amount, which represents bookings that comprise revenue that is not recognized and/or that may not be realized.

In the example of diagram 200, each ARV represents an amount of revenue generated as a result of the activity.

To illustrate, the entity represented by entity record 210 is an individual named "John Johnson". Historical activity record 220 represents a direct mailer that a particular sales representative sent to John, which was the first activity targeted at that individual. Thus, the sequence-number for historical activity record 220 is '1'. The outcome of the direct mailer was a response email from John indicating potential interest, but because the response did not directly generate revenue, the ARV of historical activity record 220 is $0. Historical activity record 222 represents an email that the sales representative sent to John in response to the email from John. This activity was the second activity targeted at John and, as such, the sequence-number for historical activity record 222 is '2'. The outcome of the email was a scheduled meeting with John, but because the response did not directly generate revenue, the ARV of historical activity record 222 is also $0. Historical activity record 224 represents a telephone call that the sales representative had with John, i.e., in connection with the scheduled meeting. This activity was the third activity targeted at John and, as such, the sequence-number for historical activity record 224 is '3'. The outcome of the telephone call was a commitment to buy a product worth $200, and, as such, the ARV of historical activity record 224 is $200.

According to one or more embodiments, each historical activity record is associated with one or more of:

A type of activity, such as telephone call, direct mailing, email, text message, in-person, video chat, etc.;

A representative identifier, which identifies a sales representative that initiated the activity represented by the historical activity record;

An entity identifier, which uniquely identifies the entity;

A pipeline phase identifier, which identifies the phase of the entity with respect to the sales pipeline (such as lead, prospect, customer, etc.);

An entity score, as described above;

A time stamp of the represented activity instance;

An outcome value, as described above.

Creating a Marginal Value Matrix

At step 104 of flowchart 100, each entity, of the plurality of entities, is assigned to a respective bucket in a plurality of buckets based, at least in part, on the entity score of the entity. For example, the MVM application assigns each entity of a plurality of entities, maintained by the application in the entity data store, to a respective bucket of a configurable number of buckets based on entity scores assigned to each entity by entity scoring technique 202. According to an embodiment, the plurality of entities includes all entities for which records are maintained. According to another embodiment, the plurality of entities includes only one or more types of entities, such as only customers, or only prospects and customers. Such limiting of the types of entities being used to generate the MVM can ensure that the MVM includes data for entities that have progressed from leads.

According to an embodiment, all historical information that feeds a particular MVM is from the same organization, the trends for which are then identifiable from the MVM. According to another embodiment, historical information that feeds a particular MVM are from a plurality of organizations having similar attributes, thereby increasing the dataset from which information for the MVM may be drawn.

To illustrate MVM construction, an administrator sets a bucket parameter for the MVM application to '5'. Based on the bucket parameter, the MVM application sorts a plurality of entities from the entity data store into five buckets (referred to herein as buckets A, B, C, D, and E) such that two or more of the plurality of entities are assigned to each bucket. According to an embodiment, the MVM application automatically assigns each of the five buckets an equal range of entity scores, which, in the case of percentage-type entity scores, results in the following entity score distribution: bucket A: 80-100%; bucket B: 60-80%; bucket C: 40-60%; bucket D: 20-40%; and bucket E: 0-20%. According to another embodiment, the MVM application assigns entity score ranges, to each bucket, such that the entity records being sorted into the buckets are evenly distributed across the buckets.

At step 106 of flowchart 100, an MVM is calculated by: for each bucket of the plurality of buckets, calculating a marginal value for each sequence-number of a plurality of sequence-numbers, where, within the MVM, the marginal value for each bucket/sequence-number combination is calculated based on: (a) a sum of activity result values for historical activity records associated with the bucket/sequence-number combination, and (b) a total number of historical activity records associated with the bucket/sequence-number combination. For example, for each bucket/sequence-number combination, the MVM application calculates an incremental marginal value $M_{i,j}$ (where i represents the bucket index and j represents the sequence-number) based on the following Formula (1):

$$M_{ij}=V_{i,j}/A_{i,j} \quad \text{Formula (1)}$$

where $V_{i,j}$ represents the total of ARVs realized at sequence-number j from all entity records assigned to bucket index i; and $A_{i,j}$ represents the total number of historical activity records that have sequence-number j from all entity records assigned to bucket index i.

FIG. 3 depicts an example MVM 300, where each row represents one of the buckets A-E, and each column represents a sequence-number. As depicted in FIG. 3, the incremental marginal value calculated based on ARVs in bucket A having the sequence-number 1 is $120.00. For example, 10 entity records were sorted into bucket A. All of the 10 entity records are associated with a historical activity record with a sequence-number of 1, each of which has an ARV of $0 except for two historical activity records with ARVs of $600. Thus, the total of ARVs realized at sequence-number 1 from all entities assigned to bucket index A is $1200, and the total number of historical activity records that have sequence-number 1 from all entities assigned to bucket index is 10. Applying Formula (1) indicated above, the marginal value $M_{A,1}$=($1200/10)=$120.00. The other example marginal values depicted in MVM 300 are also calculated by applying Formula (1). The marginal values of MVM 300 that are nil (e.g., $M_{C,8}$, $M_{D,7}$, etc.) indicate that the corresponding bucket/sequence-number combinations map to no historical activity records in the plurality of entity records being used for MVM 300.

Using a Marginal Value Matrix to Predict Incremental Marginal Values for Current Entities One or more MVMs may be used to predict a marginal value for a current entity, i.e., an entity that is currently being attended to by a sales representative, where the current entity may or may not have been the basis for any of the one or more MVMs. By determining predicted marginal values for current entities, end-users (such as sales people, sales managers, operations managers, etc.) are able to prioritize activities with respect to all of the applicable current entities. For example, a salesperson may identify whether it's more likely to be most effective to follow up with an existing highly-rated prospect, to start pursuing a new highly-rated prospect, to work with a new low-rated prospect, or to contact an existing but potentially exhausted prospect.

Figure 4:
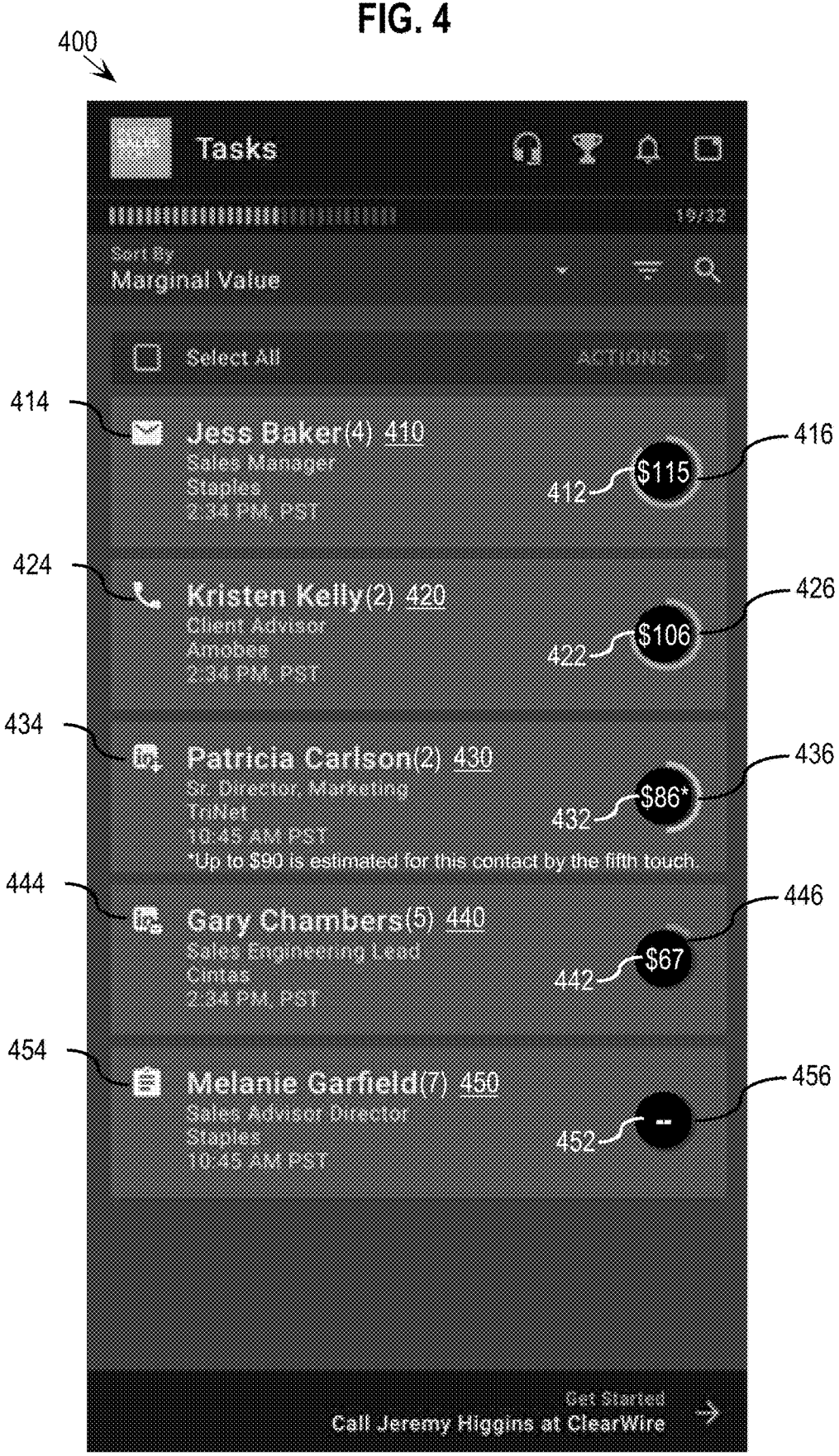
FIG. 4 depicts a graphical user interface that displays a recommended structured workflow, including current entity information and associated non-cumulative predicted marginal values.

At step 108 of flowchart 100, a predicted marginal value for each current entity in a set of current entities is predicted based at least in part on the MVM. For example, the MVM application determines to predict a marginal value for a given current entity. To illustrate, a particular sales representative requests a graphical user interface (GUI), such as GUI 400 of FIG. 4, which depicts a structured workflow recommendation that includes information for current entities with associated predicted marginal values, where the entity information is sorted based on the predicted marginal values. In response to receiving the request for the GUI, the MVM application determines to predict marginal values for a set of current entities that are associated with the identifier of the particular sales representative. According to an embodiment, the set of current entities includes all current entities associated with the sales representative.

According to an embodiment, the MVM application identifies a particular bucket, of the plurality of buckets, for the current entity based on an entity score calculated for the particular current entity, e.g., calculated via entity scoring technique 202. According to an embodiment, identifying the particular bucket for the current entity is based on the entity score falling within a range of scores that is associated with the particular bucket. For example, a particular sales representative has a sales prospect, a corporate representative named Jess Baker, to whom the sales representative has targeted sales activities three times. GUI 400 represents this entity as entity 410. The entity score for the prospect is 85%. Based on the example entity score ranges set forth above for buckets A-E, in which the range of entity scores is evenly divided across the five buckets, the prospect is assigned to bucket A.

The MVM application also identifies a next sequence-number for the current entity based, at least in part, on a most-advanced sequence-number for historical activity records associated with the current entity. Continuing with the above example, the most-advanced sequence-number for the prospect is 3, which means that the next contact activity that targets the prospect will have a sequence-number of 4. In the example of GUI 400, this next sequence-number is indicated in parenthesis next to the name of entity 410. The MVM application determines a predicted marginal value for the current entity based, at least in part, on the marginal value, in the MVM, for the combination of the particular bucket and a next sequence-number, $M_{A,4}$. Using the example MVM 300 of FIG. 3, the incremental marginal value indicated for $M_{A,4}$ is $115.17, depicted at display value 412. In the embodiment depicted in FIG. 4, the display values 412, 422, 432, and 442 are rounded down, but embodiments are not limited to such a manner of display.

Similarly, the MVM application sorts entity 420 depicted in GUI 400, which is associated with only one historical activity record, into bucket B. Since the next sequence-number for the entity is 2, the MVM application identifies the predicted incremental marginal value for entity 420 to be $M_{B,2}$ in MVM 300, i.e., $106.67, which is represented by display value 422. The MVM application sorts entity 430, which is also associated with only one historical activity record, into bucket C. Since the next sequence-number for entity 430 is 2, the MVM application identifies the predicted incremental marginal value for entity 430 to be $M_{C,2}$ in MVM 300, i.e., $86.02, which is represented by display value 432. The MVM application sorts entity 440, which is associated with four historical activity records, into bucket E. Since the next sequence-number for the entity is 5, the MVM application identifies the predicted incremental marginal value for entity 440 to be $M_{E,5}$ in MVM 300, i.e., $67.51, which is represented by display value 442.

Furthermore, entity 450 is sorted into bucket D and has been targeted by contact activities six times. Because there is no data in MVM 300 for $M_{D,7}$, the marginal value for entity 450 is nil.

Graphical User Interface

At step 110 of flowchart 100, information that identifies a recommended current entity, of the set of current entities, associated with the highest predicted marginal value is displayed in a graphical user interface. Continuing with the above example, the MVM application displays, in GUI 400, information identifying the current entity 410 and also a display value 412 that represents the predicted incremental marginal value determined for the prospect, $115. In the embodiment of GUI 400, the entity information is sorted based on the magnitude of the predicted marginal value, with the entity information associated with the highest predicted marginal value being presented first.

The display values in GUI 400 (e.g., display values 412, 422, 432, 442, and 452) for each current entity, are represented as dollar amounts. Displaying a dollar amount that corresponds to the marginal value of a given current entity can help make the recommended workflow more concrete for the sales representative, thereby increasing the effectiveness of the communication to the sales representative via the GUI. According to an embodiment, the marginal values in MVM 300 are also represented as dollar amounts, resulting in no need to convert the predicted marginal values to monetary amounts for display. According to another embodiment, the marginal values recorded in a given MVM are percentages, such as percentages representing likelihoods that contacting entities will result in revenue won. In this embodiment, the MVM application calculates a monetary display value for a given current entity based on the percentage-type marginal value identified from the MVM, and displays the display value in the GUI.

According to an embodiment, the MVM application further displays, for each displayed current entity, an effectiveness symbol, such as symbols 416, 426, 436, 446, and 456 of GUI 400. The visual look of each effectiveness symbol is based on the associated predicted marginal value, and gives an indication of the relative effectiveness of pursuing the indicated activity for the entity. In the example of GUI 400, an effectiveness symbol is a portion of a colored circle, where the portion of the circle corresponds to a percentage of the range of possible marginal values, in the corresponding MVM, that the corresponding predicted marginal value captures. According to another embodiment, an effectiveness symbol illustrates a percentile of the corresponding predicted marginal value, which percentile is calculated based on a rank ordering of the predicted marginal values being represented. The color of the symbol reinforces the indicated percentiles. For example, symbols for predicted marginal values in the top third of the percentile are green, symbols for predicted marginal values in the second third of the percentile are yellow, and symbols for predicted marginal values in the lowest third of the percentile are red.

In the example of GUI 400, symbol 416 indicates that the associated marginal value is in the $90^{th}$ percentile of the range of marginal values MVM 300. Further, symbols 426, 436, and 446, respectively indicate that the associated predicted marginal values are in the $75^{th}$ percentile ($106), $50^{th}$ percentile ($86), and $10^{th}$ percentile ($67) of possible marginal values in MVM 300. Symbol 456, or the apparent lack thereof, visually reinforces that there is no data on a marginal value for current entity 450.

Adjusting Marginal Values to Reflect Future Potential

According to an embodiment, when marginal values decrease as sequence-numbers increase in an MVM, the incremental marginal value for a given current entity, as described in detail above, effectively represents the value of an activity targeting the associated entity. However, at times, the marginal values for a given bucket in an MVM increase as sequence-numbers increase. For example, in MVM 300, the marginal values for bucket C increase from sequence-number 1 to sequence-number 5, i.e., from $85.65 to $90.51. Subsequent to sequence-number 5, the marginal values for bucket C decrease. Failing to communicate the potential for increase in these situations can result in failure to explore paths with increasing marginal values.

Thus, according to an embodiment illustrated in GUI 400 for entity 430, the MVM application causes information, about the potential for higher marginal values for subsequent activities targeted to the entity, to be displayed in the GUI. As shown in the example GUI 400, entity 430 is visually associated with the information: "Up to $90 is estimated for this contact by the fifth touch." In this way, the GUI conveys the information that there might be additional value by persevering in further activities targeted to the entity.

According to another embodiment, the MVM application selects, for a predicted marginal value for a given entity, the maximum of subsequent marginal values (i.e., maximum future step marginal values), in MVM 300 for the bucket into which the entity is sorted. In this embodiment, an entity that is sorted into bucket C is associated with a display value of $90 at each of sequence-numbers 1-5. After sequence-number 5, the marginal numbers in MVM 300 for bucket C decrease. As such, the maximum future step-type marginal number for each of sequence-numbers 6 and 7 for an entity sorted to bucket C is the marginal value at $M_{C,6}$, and $M_{C,7}$, respectively.

Cumulative Predicted Marginal Values

Further, at times, it may be beneficial to take into account all subsequent marginal values in a given MVM when calculating predicted marginal values for a given entity. For example, notwithstanding a seemingly good incremental predicted marginal value for a given entity, future marginal values for the entity are not favorable. The information about the unfavorable future marginal values would likely influence the decision of the salesperson regarding pursuing a sales activity targeting the entity. As such, according to yet another embodiment, the MVM application calculates maximum cumulative predicted marginal values for the current entities of a salesperson by considering the marginal values for subsequent sequence-numbers, in the MVM, when calculating the predicted marginal value. Thus, the maximum cumulative-type predicted marginal values communicate the potential for growth or loss in light of subsequent marginal value data in the MVM.

Specifically, the total future marginal value of an activity with a sequence-number j targeted to an entity that has been sorted into a bucket index i, i.e., $M_{i,j}$, is shown in Formula (2) below.

$$M_{i,j} + aM_{i,j+1} + a^2 M_{i,j+2} + \ldots + a^n M_{i,j+n} = \Sigma_{x=0}^{n} a^x M_{i,j+x} \quad \text{Formula (2)}$$

In Formula (2), a is a discount factor (a=1 for no discount), and n is the number of additional actions beyond the identified next sequence-number being considered as future values for a maximum cumulative marginal value calculation for a given entity. The discount factor, a, is a configurable value of the MVM application. The discount factor allows a user to take into account the time value of money, hyperbolic discounting, inflation, exogenous risk, existential risk, etc.

The entire course of actions for a given entity is not always followed to the end of the known sequence-numbers in a given MVM. In other words, a salesperson may choose to cease targeting activities to a current entity, e.g., when the predicted marginal value of a further action no longer exceeds the cost of taking that action. In fact, it is generally beneficial for a salesperson to cease performing activities that are likely to end in a net deficit. Thus, according to an embodiment, the MVM application produces a predicted marginal value of a given entity based on the maximum cumulative predicted marginal value possible for the entity, as shown in Formula (3) below.

$$\max(0, M_{i,j}, M_{i,j} + aM_{i,j+1}, M_{i,j} + aM_{i,j+1} + a^2 M_{i,j+2}, \ldots, \Sigma_{x=0}^{n} a^x M_{i,j+x}) \quad \text{Formula (3)}$$

In other words, the predicted marginal value for an entity given a particular bucket/sequence-number combination is the highest accumulation of a subset of the marginal values for subsequent sequence-numbers starting at the current sequence-number j.

Figure 6A:
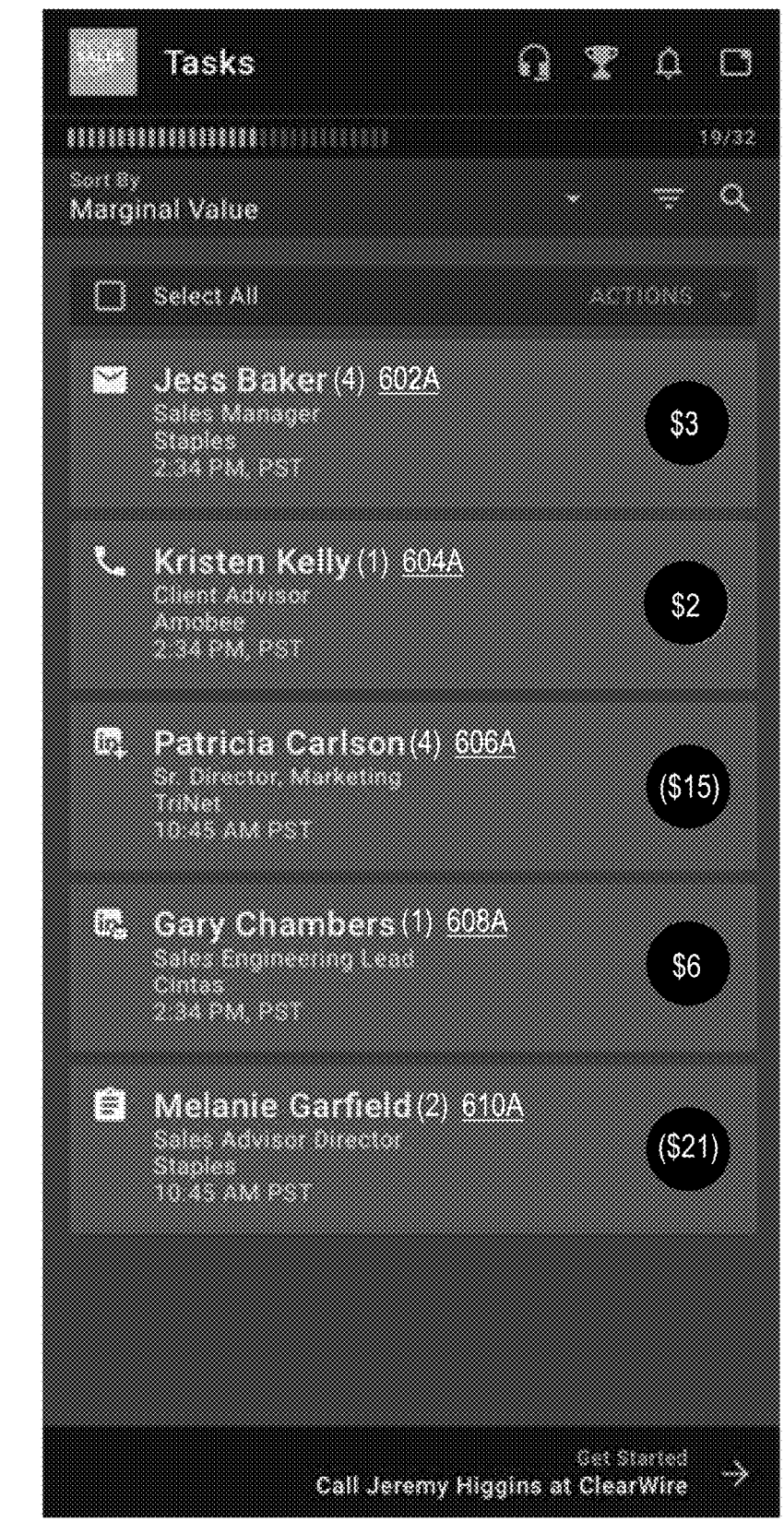
FIGS. 6A-C depict graphical user interfaces showing various techniques for identifying predicted marginal values for current entities from a particular marginal value matrix.
Figure 6B:
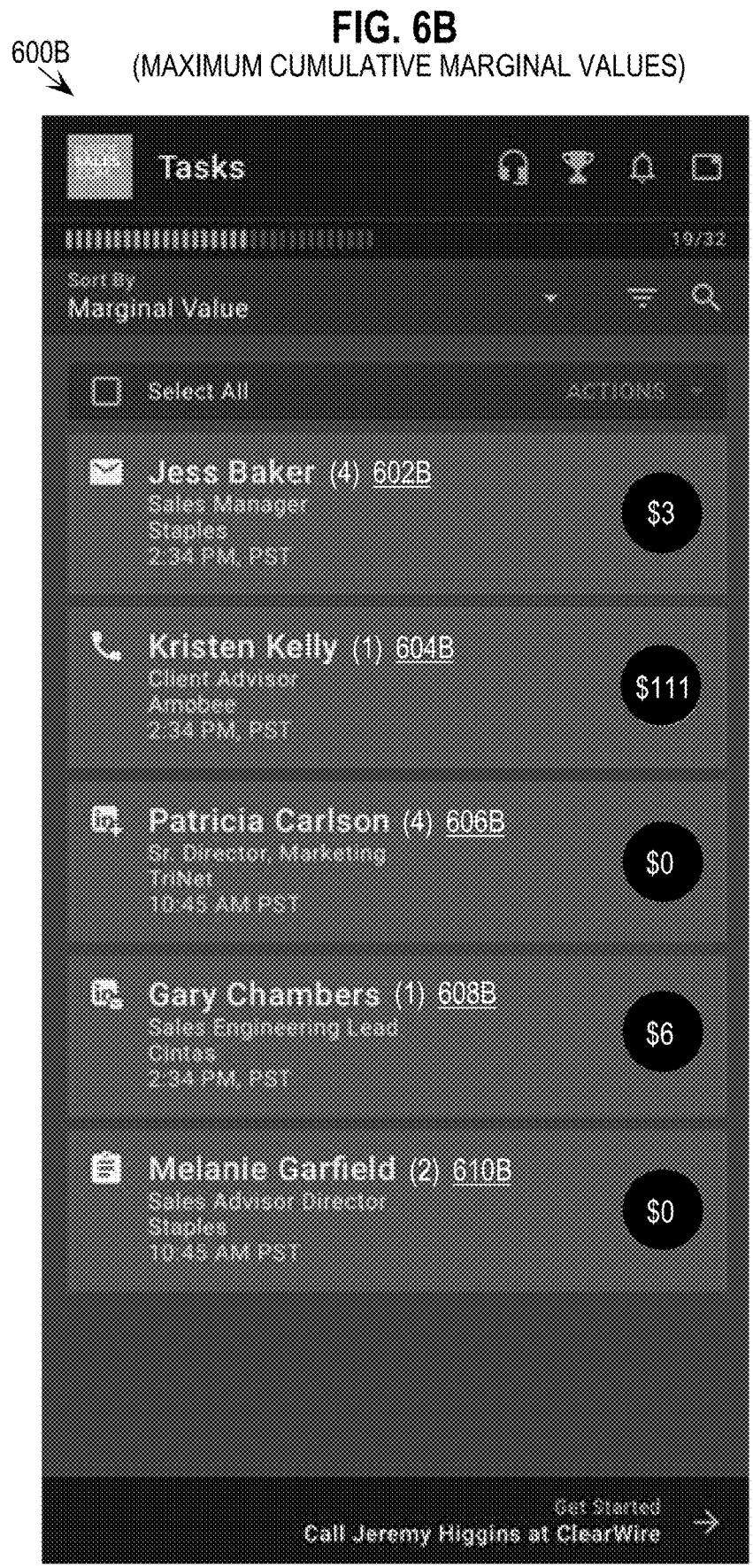
Figure 6C:
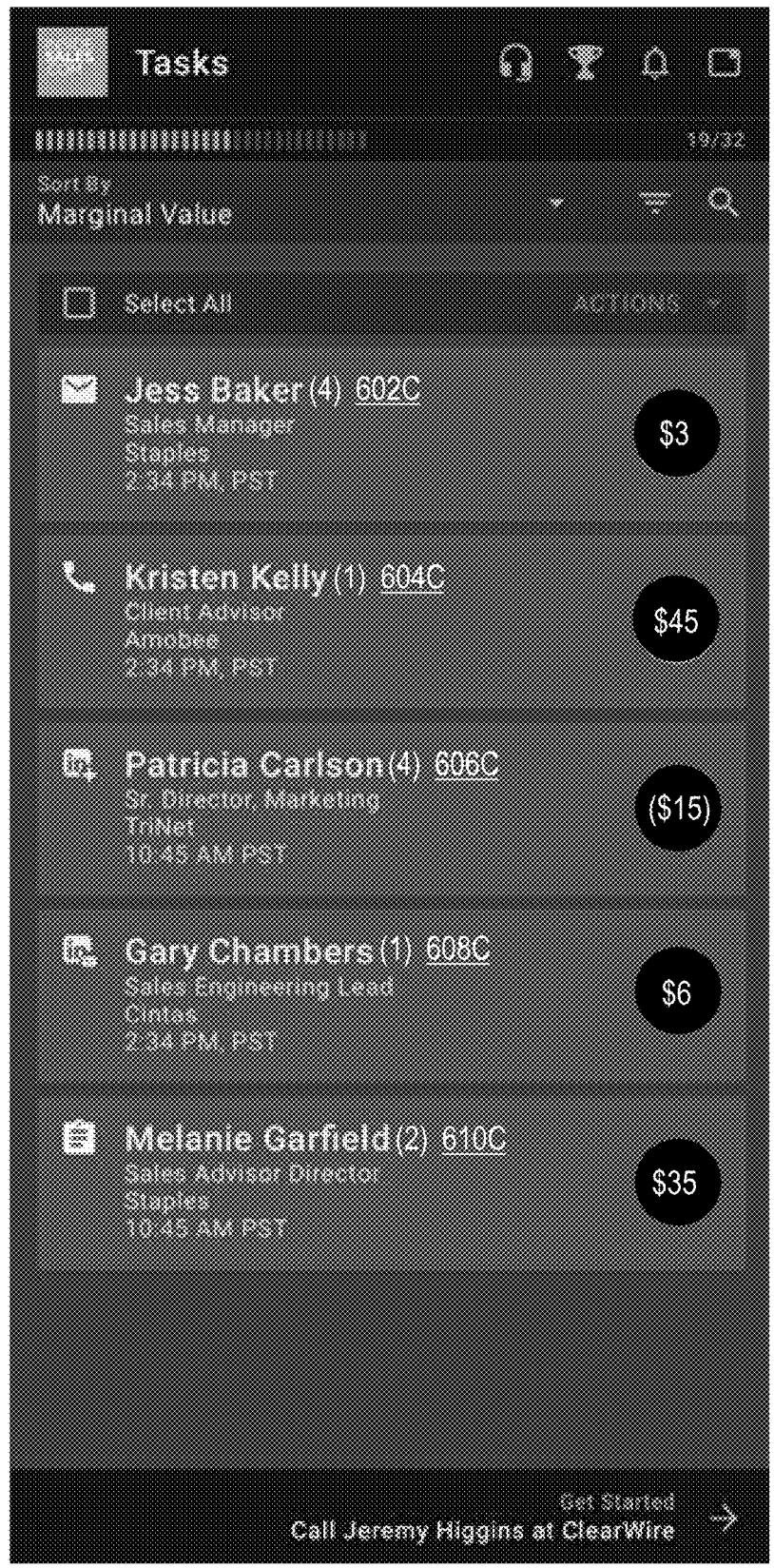

To illustrate, FIG. 5 depicts an MVM 500 that shows a net loss for some combinations of bucket identifiers and sequence-numbers, as depicted in parenthesis, e.g., $M_{4,5}$ shows a loss of $2.13, $M_{4,6}$ shows a loss of $15.81, etc. Furthermore, FIGS. 6A-C depict GUIs 600A-C that show the results of various embodiments of predicting marginal values from MVM 500. Specifically, GUI 600A of FIG. 6A depicts incremental predicted marginal values as described in detail above in connection with flowchart 100. GUI 600B of FIG. 6B depicts maximum cumulative predicted marginal values identified using Formula (3) above. GUI 600C of FIG. 6C depicts maximum future step-type predicted marginal values, also described above. The current entities in these GUIs are not ordered by their associated predicted marginal value magnitude for ease of explanation of the differences between the marginal value calculation techniques. However, according to an embodiment, such GUIs are sorted and/or show effectiveness symbols for the depicted predicted marginal values.

As depicted in GUIs 600A-C, three previous activities have targeted current entity 602 (A-C), and, as such, the next sequence-number identified for entity 602 is 4. Using similar logic, the next sequence-numbers for the other entities in GUIs 600A-C are as follows:

current entity 604 (A-C): 1 (no actions previously targeted the entity);
current entity 606 (A-C): 4 (three actions previously targeted the entity);
current entity 608 (A-C): 1 (no actions previously targeted the entity); and
current entity 610 (A-C): 2 (one action previously targeted the entity).

Using the maximum cumulative predicted marginal value technique via Formula (3) and a discount value (a) of 1, which is depicted in GUI 600B, the predicted marginal values for the current entities are as follows:

Current entity 602B, which is sorted into bucket A based on an entity score generated for the entity, has a display value of $3 that represents the maximum cumulative predicted marginal value for the entity from MVM 500. Specifically, the starting marginal value for current entity 602B is at $M_{A,4}$, which is $3.07. The subsequent marginal values in bucket A are negative values. As such, the maximum cumulative value for current entity 602B is $M_{A,4}$.

Current entity 604B, which is sorted into bucket B based on an entity score generated for the entity, has a display value of $111 that represents the maximum cumulative predicted marginal value for the entity. Specifically, the starting marginal value for current entity 604B is at $M_{B,1}$: $2.95. The subsequent marginal values in bucket B are positive until $M_{B,6}$, which is $6.25. As such, the maximum cumulative value for current entity 604B is $\Sigma_{x=0}^{5} M_{B,1+x}$ (since a=1 in this example, this component is omitted), which is $2.95+$18.81+$21.20+$45.50+$16.80+$6.25=$111.51.

Current entity 606B, which is sorted into bucket C based on an entity score generated for the entity, has a display value of $0 that represents the maximum cumulative predicted marginal value for the entity. Specifically, the starting marginal value for current entity 606B is $M_{C,4}$, which is negative $15.81, and all other subsequent marginal values in MVM 500 for bucket C are also negative. As such, zero is the largest possible cumulative value for current entity 606B as indicated in Formula (3).

Current entity 608B, which is sorted into bucket D based on an entity score generated for the entity, has a display value of $6 that represents the maximum cumulative predicted marginal value for the entity. Specifically, the starting marginal value for current entity 608B is at $M_{D,1}$: $6:51. The subsequent marginal values in bucket D are negative values. As such, the maximum cumulative value for current entity 608B is $M_{D,1}$.

Current entity 610B, which is sorted into bucket E based on an entity score generated for the entity, has a display value of $0 that represents the maximum cumulative predicted marginal value for the entity. Specifically, the starting marginal value for current entity 610B is $M_{E,2}$, which is negative $21.20. All other subsequent marginal values in MVM 500 for bucket E are negative except for $M_{E,5}$. However $\Sigma_{x=0}^{n} a^x M_{E,2+x}$ (where a=1) at each possible n value is negative. As such, zero is the largest possible cumulative value for current entity 610B as indicated in Formula (3).

Thus, the recommended ordering for the current entities based on maximum cumulative predicted marginal values is as follows: (1) current entity 604B, (2) current entity 608B, and then (3) current entity 602B, with both current entities 606B and 610B having no predicted marginal value.

Contrasting Examples of Marginal Value Calculation Techniques

In contrast, the ordered recommendation resulting from the incremental predicted marginal technique differs from the ordered recommendation resulting from the maximum cumulative predicted marginal value technique described above. Specifically, using the incremental predicted marginal value technique depicted in GUI 600A and described in detail above in connection with flowchart 100, the predicted marginal values for the current entities 602A-610A are as follows:

current entity 602A, which is sorted into bucket A based on its entity score, has an incremental predicted marginal value of $3.07 ($M_{A,4}$);
current entity 604A, which is sorted into bucket B based on its entity score, has an incremental predicted marginal value of $2.95 ($M_{B,1}$);
current entity 606A, which is sorted into bucket C based on its entity score, has an incremental predicted marginal value of negative $15.81 ($M_{C,4}$);
current entity 608A, which is sorted into bucket D based on its entity score, has an incremental predicted marginal value of $6.51 ($M_{D,1}$); and
current entity 610A, which is sorted into bucket E based on its entity score, has an incremental predicted marginal value of negative $21.20 ($M_{E,2}$).

Thus, the recommended ordering for the current entities based on incremental predicted marginal values is as follows: (1) current entity 608A, (2) current entity 602A, (3) current entity 604A, (4) current entity 606A, and (5) current entity 610A.

In further contrast, the ordered recommendation resulting from the maximum future step predicted marginal value technique differs from both of the ordered recommendations resulting from the maximum cumulative predicted marginal value technique and from the incremental predicted marginal technique. Specifically, using the maximum future step predicted marginal value technique depicted in GUI 600C, the predicted marginal values for the current entities are as follows:

current entity 602C, which is sorted into bucket A based on its entity score, has a maximum future step-type predicted marginal value of $3.07 (at $M_{A,4}$, which is the largest marginal value in $M_{A,4}$ through $M_{A,9}$);
current entity 604C, which is sorted into bucket B based on its entity score, has a maximum future step-type predicted marginal value of $45.50 (at $M_{B,4}$, which is the largest marginal value in $M_{B,1}$ through $M_{B,9}$);
current entity 605C, which is sorted into bucket C based on its entity score, has a maximum future step-type predicted marginal value of negative $15.81 (at $M_{C,4}$, which is the largest marginal value in $M_{C,4}$ through $M_{C,9}$);
current entity 606C, which is sorted into bucket D based on its entity score, has a maximum future step-type predicted marginal value of $6.51 (at $M_{D,1}$, which is the largest marginal value in $M_{D,1}$ through $M_{D,9}$); and
current entity 610C, which is sorted into bucket E based on its entity score, has a maximum future step-type predicted marginal value of $35.00 (at $M_{E,5}$, which is the largest marginal value in $M_{E,2}$ through $M_{E,9}$).

Thus, the recommended ordering for the current entities based on maximum future step-type predicted marginal values is as follows: (1) current entity 604C, (2) current entity 610C, (3) current entity 608C, (4) current entity 602C, and (5) current entity 606C.

Activity Type-Specific Marginal Value Matrices

According to an embodiment, marginal values are activity-type-specific. For example, a given MVM is constructed based on historical records for a particular kind of activity, or a particular combination of activity types. Such type-specific MVMs are used to predict the outcome of using the corresponding one or more kinds of activities at any given sequence-number.

According to an embodiment, the MVM application maintains a plurality of MVMs that are directed to particular types of activities, and uses a pre-determined cadence of types of activities to predict the marginal value for a next activity of any given current entity. For example, the pre-determined sequence of activity types for the MVM application are: (1) email; (2) telephone call; (3) text message; (4) email; (5) telephone call; (6) email; (7) email; (8) text message; (9) email.

According to this embodiment, after the next sequence-number for an activity for a given current entity is determined, as described in detail above, the MVM application determines which MVM to use for the predicted marginal value identification based on the type of the next contact. To illustrate in the case of entity 602 of FIGS. 6A-C, the identified next sequence-number for the entity is 4. In the example fixed sequence of activity types, the fourth contact is of type email. Thus, the MVM that the MVM application accesses for a marginal value for the combination of bucket A and sequence-number 4 is an MVM that is specific to email-type activities.

Adaptive Activity-Type Recommendations Based on Multiple Type-Specific Marginal Value Matrices According to an embodiment, the MVM application maintains a plurality of MVMs, each of which is specific to a particular kind of activity. To determine the marginal value for a given current entity, the MVM application identifies the highest marginal value for the combination of assigned bucket and next sequence-number for the current entity among the plurality of MVMs. The MVM application identifies, as a suggested next contact activity type for the current entity, the type of activity that is associated with the MVM showing the highest predicted marginal value for the current entity.

Pipeline-Based Marginal Values

According to an embodiment, an MVM (as described above) is generated based on only non-lead-type entities. For example, an ARV-type for historical activity records associated with these entities represent whether the activity progressed the targeted entity from a lead to a prospect. Using this type of ARVs, the MVM application can use this MVM to determine the potential value (monetary or otherwise) of a given lead if converted to a prospect.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
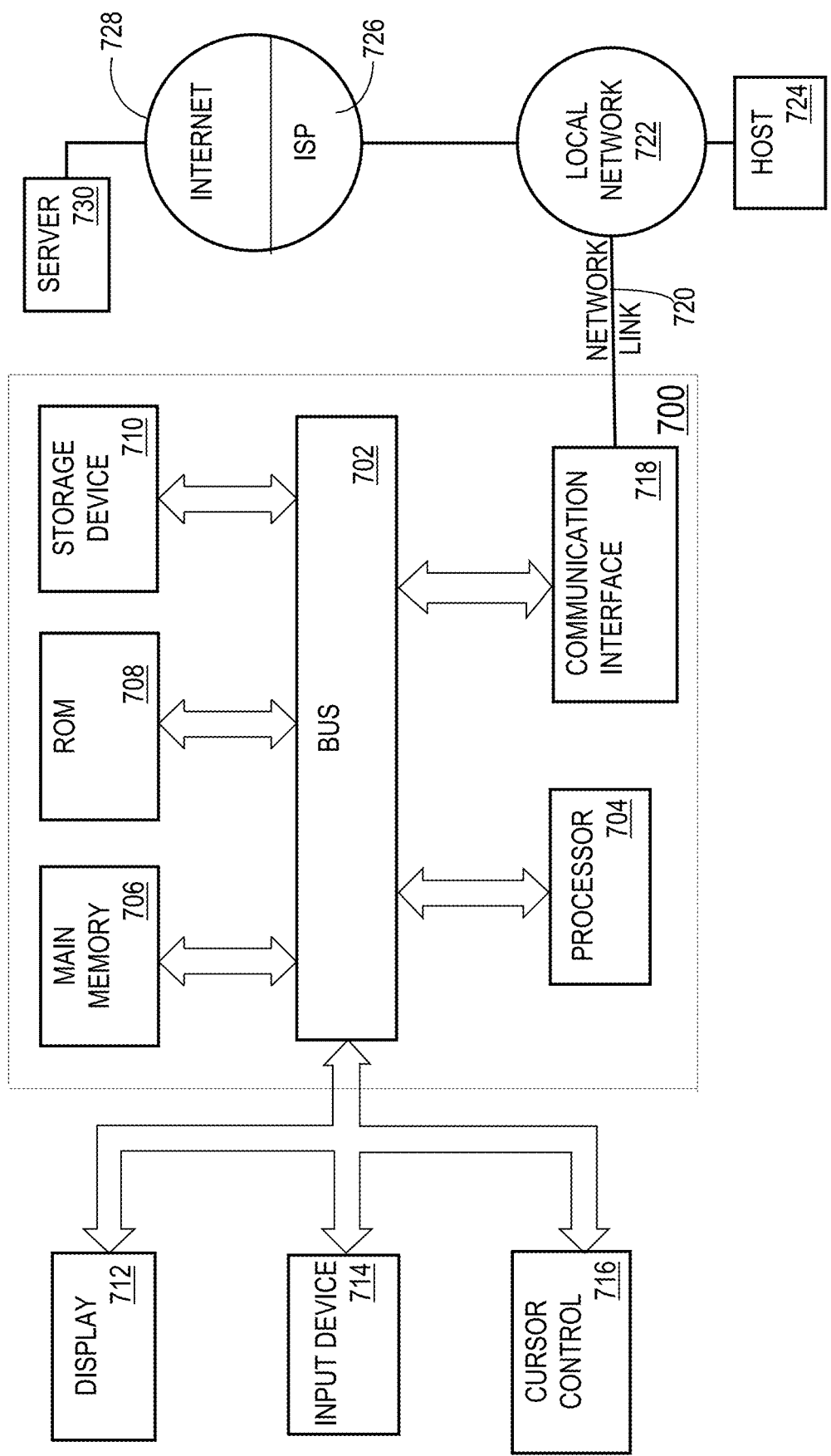
FIG. 7 depicts a computer system that may be used in an embodiment.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
executing code on one or more computing devices to cause the one or more computing devices to perform operations comprising:
maintaining, for each entity of a plurality of entities, a corresponding set of historical activity records;
wherein each historical activity record represents an activity instance that targeted communication to the corresponding entity represented in the historical activity record, wherein the targeted communication represents communication directed specifically to the corresponding entity and the historical activity record includes:
a sequence-number that reflects a temporal position of the activity instance relative to other activity instances that targeted communication to the corresponding entity, and
an activity result value;
wherein each entity, of the plurality of entities, is associated with a respective entity score and the entity score relates to a particular characteristic of the entity;
assigning each entity, of the plurality of entities, to a respective bucket in a plurality of buckets based, at least in part, on the entity score of the entity;
calculating a particular marginal value matrix by, for each bucket of the plurality of buckets, calculating a marginal value for each sequence-number of a plurality of sequence-numbers;
wherein, within the particular marginal value matrix, the marginal value for each bucket/sequence-number combination is calculated using:

$$M_{i,j} + aM_{i,j+1} + a^2 M_{i,j+2} + \ldots + a^n M_{i,j+n} = \Sigma_{x=0}^{n} a^x M_{i,j+x}$$

where M represents a marginal value, i represents a bucket index, j is a sequence-number, and a is a discount factor;

(b)
predicting, based at least in part on the particular marginal value matrix, a predicted marginal value for each current entity in a set of current entities;
displaying in a first graphical user interface effectiveness symbols based on the predicted marginal value that give an indication of a relative effectiveness to guide pursuit of an activity for each of the current entities;
displaying in a second graphical user interface structured workflow recommendation;
providing operable controls for the second graphical interface of the displayed structured workflow recommendation to allow a user to sort the set of current entities by predicted marginal value and detect time optimal activities; and
displaying, in a third graphical user interface, information that identifies a recommended current entity, of the set of current entities, associated with the highest predicted marginal value.

2. The computer-executed method of claim 1, wherein predicting, based at least in part on the particular marginal value matrix, a predicted marginal value for each current entity in the set of current entities comprises:
identifying a particular bucket, of the plurality of buckets, for a particular current entity, of the set of current entities, based on a particular entity score associated with the particular current entity;
identifying a next sequence-number for the particular current entity based, at least in part, on a most-advanced sequence-number for historical activity records associated with the particular current entity; and
determining a particular predicted marginal value for the particular current entity based, at least in part, on the marginal value, in the particular marginal value matrix, for the combination of the particular bucket and the next sequence-number.

3. The computer-executed method of claim 2, wherein:
each bucket, of the plurality of buckets, is associated with a range of entity scores; and
identifying the particular bucket, of the plurality of buckets, for the particular current entity based on the particular entity score comprises determining that the particular entity score falls within a particular range of scores associated with the particular bucket.

4. The computer-executed method of claim 2, wherein determining the particular marginal value based, at least in part, on the marginal value, in the particular marginal value matrix, for the combination of the particular bucket and the next sequence-number comprises:
wherein the marginal value for the combination of the particular bucket and the next sequence-number is a particular marginal value;
identifying one or more subsequent marginal values that are associated with combinations of the particular bucket and sequence-numbers that are higher than the next sequence-number; and
determining the particular marginal value to be a maximum cumulative predicted marginal value based, at least in part, on the particular marginal value and the one or more subsequent marginal values.

5. The computer-executed method of claim 1, wherein:
each historical activity record further includes an activity type attribute; and
the historical activity records used to calculate the particular marginal value matrix are all of one or more particular activity types.

6. The computer-executed method of claim 1, wherein:
each historical activity record further includes an activity type attribute;
the historical activity records used to calculate the particular marginal value matrix are a first set of historical activity records that are all of a first activity type; and
the method further comprises calculating a second marginal value matrix by: for each bucket of the plurality of buckets, calculating a marginal value for each sequence-number, of the plurality of sequence-numbers, based on a second set of historical activity records that are all of a second activity type; and
the first activity type is different than the second activity type.

7. The computer-executed method of claim 6, wherein predicting, based at least in part on the particular marginal value matrix, a predicted marginal value for each current entity in the set of current entities further comprises:
determining for a particular current entity, in the set of current entities, both of:
a first tentative predicted marginal value from the particular marginal value matrix, and
a second tentative predicted marginal value from the second marginal value matrix;
identifying a particular predicted marginal value, for the particular current entity, to be the tentative predicted marginal value, of the first and second tentative predicted marginal values, that is the highest value.

8. The computer-executed method of claim 7, further comprising:
identifying a recommended type of activity for the particular current entity based on a type of activity associated with the marginal value matrix from which the particular predicted marginal value was identified; and
displaying, in the graphical user interface, information identifying the recommended type of activity for the particular current entity.

9. The computer-executed method of claim 1, further comprising:
maintaining a plurality of marginal value matrices that includes the particular marginal value matrix;
wherein each marginal value matrix, of the plurality of marginal value matrices, corresponds to a corresponding activity type;
predicting, based at least in part on the particular marginal value matrix, a predicted marginal value for each current entity in the set of current entities comprises:
determining a next activity type for a particular current entity, of the set of current entities, based, at least in part, on a pre-determined sequence of activity types, and
predicting a particular predicted marginal value for the particular current entity using the particular marginal value matrix, of the plurality of marginal value matrices, based on the particular marginal value matrix corresponding to the next activity type.

10. The computer-executed method of claim 1, further comprising displaying, in the graphical user interface, in connection with the information that identifies the recommended current entity, a dollar amount that is calculated based, at least in part, on the predicted marginal value that was predicted for the recommended current entity.

11. One or more non-transitory computer-readable media storing instructions that, when executed by one or more processors, cause:
maintaining, for each entity of a plurality of entities, a corresponding set of historical activity records;
wherein each historical activity record represents an activity instance that targeted communication to the corresponding entity represented in the historical activity record, wherein the targeted communication represents communication directed specifically to the corresponding entity and the historical activity record includes:
a sequence-number that reflects a temporal position of the activity instance relative to other activity instances that targeted communication to the corresponding entity, and
an activity result value;
wherein each entity, of the plurality of entities, is associated with a respective entity score and the entity score relates to a particular characteristic of the entity;
assigning each entity, of the plurality of entities, to a respective bucket in a plurality of buckets based, at least in part, on the entity score of the entity;
calculating a particular marginal value matrix by, for each bucket of the plurality of buckets, calculating a marginal value for each sequence-number of a plurality of sequence-numbers;
wherein, within the particular marginal value matrix, the marginal value for each bucket/sequence-number combination is calculated using:

$$M_{i,j}+aM_{i,j+1}+a^2M_{i,j+2}+\ldots+a^nM_{i,j+n}=\Sigma_{x=0}^{n}a^xM_{i,j+x}$$

where M represents a marginal value, i represents a bucket index, j is a sequence-number, and a is a discount factor;

(b)
predicting, based at least in part on the particular marginal value matrix, a predicted marginal value for each current entity in a set of current entities;
displaying in a first graphical user interface effectiveness symbols based on the predicted marginal value that give an indication of a relative effectiveness to guide pursuit of an activity for each of the current entities;
displaying in a second graphical user interface structured workflow recommendation;
providing operable controls for the second graphical interface of the displayed structured workflow recommendation to allow a user to sort the set of current entities by predicted marginal value and detect time optimal activities;
displaying, in a third graphical user interface, information that identifies a recommended current entity, of the set of current entities, associated with the highest predicted marginal value.

12. The one or more non-transitory computer-readable media of claim 11, wherein predicting, based at least in part on the particular marginal value matrix, a predicted marginal value for each current entity in the set of current entities comprises:
identifying a particular bucket, of the plurality of buckets, for a particular current entity, of the set of current entities, based on a particular entity score associated with the particular current entity;
identifying a next sequence-number for the particular current entity based, at least in part, on a most-advanced sequence-number for historical activity records associated with the particular current entity; and
determining a particular predicted marginal value for the particular current entity based, at least in part, on the marginal value, in the particular marginal value matrix, for the combination of the particular bucket and the next sequence-number.

13. The one or more non-transitory computer-readable media of claim 12, wherein:
each bucket, of the plurality of buckets, is associated with a range of entity scores; and
identifying the particular bucket, of the plurality of buckets, for the particular current entity based on the particular entity score comprises determining that the particular entity score falls within a particular range of scores associated with the particular bucket.

14. The one or more non-transitory computer-readable media of claim 12, wherein determining the particular marginal value based, at least in part, on the marginal value, in the particular marginal value matrix, for the combination of the particular bucket and the next sequence-number comprises:
wherein the marginal value for the combination of the particular bucket and the next sequence-number is a particular marginal value;
identifying one or more subsequent marginal values that are associated with combinations of the particular bucket and sequence-numbers that are higher than the next sequence-number; and
determining the particular marginal value to be a maximum cumulative predicted marginal value based, at least in part, on the particular marginal value and the one or more subsequent marginal values.

15. The one or more non-transitory computer-readable media of claim 11, wherein:
- each historical activity record further includes an activity type attribute; and
- the historical activity records used to calculate the particular marginal value matrix are all of one or more particular activity types.

16. The one or more non-transitory computer-readable media of claim 11, wherein:
- each historical activity record further includes an activity type attribute;
- the historical activity records used to calculate the particular marginal value matrix are a first set of historical activity records that are all of a first activity type; and
- the instructions further comprise instructions that, when executed by one or more processors, cause calculating a second marginal value matrix by: for each bucket of the plurality of buckets, calculating a marginal value for each sequence-number, of the plurality of sequence-numbers, based on a second set of historical activity records that are all of a second activity type; and
- the first activity type is different than the second activity type.

17. The one or more non-transitory computer-readable media of claim 16, wherein predicting, based at least in part on the particular marginal value matrix, a predicted marginal value for each current entity in the set of current entities further comprises:
- determining for a particular current entity, in the set of current entities, both of:
  - a first tentative predicted marginal value from the particular marginal value matrix, and
  - a second tentative predicted marginal value from the second marginal value matrix;
- identifying a particular predicted marginal value, for the particular current entity, to be the tentative predicted marginal value, of the first and second tentative predicted marginal values, that is the highest value.

18. The one or more non-transitory computer-readable media of claim 17, wherein the instructions further comprise instructions that, when executed by one or more processors, cause:
- identifying a recommended type of activity for the particular current entity based on a type of activity associated with the marginal value matrix from which the particular predicted marginal value was identified; and
- displaying, in the graphical user interface, information identifying the recommended type of activity for the particular current entity.

19. The one or more non-transitory computer-readable media of claim 11, wherein the instructions further comprise instructions that, when executed by one or more processors, cause:
- maintaining a plurality of marginal value matrices that includes the particular marginal value matrix;
- wherein each marginal value matrix, of the plurality of marginal value matrices, corresponds to a corresponding activity type;
- predicting, based at least in part on the particular marginal value matrix, a predicted marginal value for each current entity in the set of current entities comprises:
  - determining a next activity type for a particular current entity, of the set of current entities, based, at least in part, on a pre-determined sequence of activity types, and
  - predicting a particular predicted marginal value for the particular current entity using the particular marginal value matrix, of the plurality of marginal value matrices, based on the particular marginal value matrix corresponding to the next activity type.

20. The one or more non-transitory computer-readable media of claim 11, wherein the instructions further comprise instructions that, when executed by one or more processors, cause displaying, in the graphical user interface, in connection with the information that identifies the recommended current entity, a dollar amount that is calculated based, at least in part, on the predicted marginal value that was predicted for the recommended current entity.

\* \* \* \* \*